United States Patent [19]

Larson et al.

[11] Patent Number: 4,494,417

[45] Date of Patent: Jan. 22, 1985

[54] FLEXIBLE ARM, PARTICULARLY A ROBOT ARM

[75] Inventors: Ove Larson, Gothenburg; Charles Davidson, Askim, both of Sweden

[73] Assignee: Robotgruppen HB, Molndal, Sweden

[21] Appl. No.: 426,964

[22] Filed: Sep. 29, 1982

Related U.S. Application Data

[63] Continuation-in-part of Ser. No. 351,589, Feb. 23, 1982, Pat. No. 4,393,728, which is a continuation of Ser. No. 129,202, Mar. 11, 1980, abandoned.

[30] Foreign Application Priority Data

Mar. 16, 1979 [SE] Sweden .............................. 7902366

[51] Int. Cl.³ .......................... B25J 1/02; F16C 1/00; A61F 1/06
[52] U.S. Cl. .............................. 74/469; 3/1; 3/1.1; 3/1.2; 446/368; 446/383; 74/479; 74/501 R; 81/177 F; 414/7; 901/21; 901/22; 901/23; 901/28
[58] Field of Search ................ 74/469, 501 R, 501 M, 74/479; 3/1, 1.1, 1.2, 12.3, 12.6, 12.7; 15/104.3 SN; 46/126, 152; 403/220; 81/177 F; 248/160, 274; 414/4, 7; 128/6, 7, DIG. 9; 464/149; 901/19, 21, 22, 23, 28

[56] References Cited

U.S. PATENT DOCUMENTS

| | | | |
|---|---|---|---|
| 2,241,576 | 5/1941 | Barton | 46/152 |
| 2,421,279 | 5/1947 | Marty | 46/126 |
| 3,060,972 | 10/1962 | Sheldon | 74/501 R X |
| 3,190,286 | 6/1965 | Stokes | 128/6 |
| 3,266,059 | 8/1966 | Stelle | 3/12.3 |
| 3,284,964 | 11/1966 | Saito | 414/7 |
| 3,497,083 | 2/1970 | Anderson et al. | 3/12.3 X |
| 3,546,961 | 12/1970 | Marton | 74/501 R |
| 3,623,566 | 11/1971 | Orloff | 46/152 X |
| 3,927,899 | 12/1975 | Bough | 464/149 X |
| 4,151,757 | 5/1979 | Pitrat | 74/501 M |

Primary Examiner—Allan D. Herrmann
Attorney, Agent, or Firm—Holman & Stern

[57] ABSTRACT

A flexible arm particularly a robot arm comprising a plurality of elements arranged in a series with adjacent elements in abutting relationship, said elements being interconnected via cables and if desired a power transferring actuating device. The arm has very good rigidity in the bending plane of each element and high torsional resistance together with low manufacturing costs. Each element is designed with opposed single or double-curved segments, or flat surfaces, or combinations thereof with the curved surfaces of each segment engaging the curved or flat surfaces of the adjacent segments, whereby the elements when actuated by the power transferring device have a rolling motion relative to each other.

6 Claims, 18 Drawing Figures

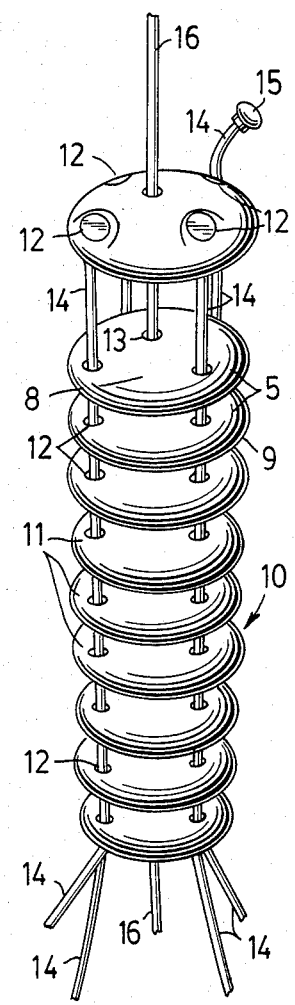
FIG. I
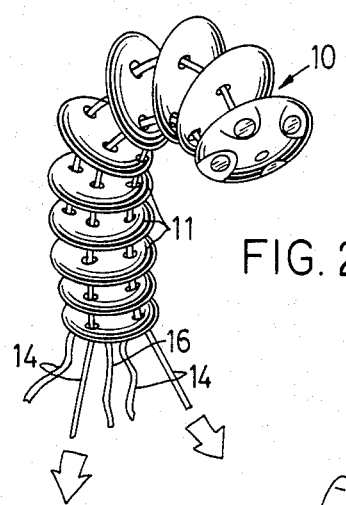
FIG. 2
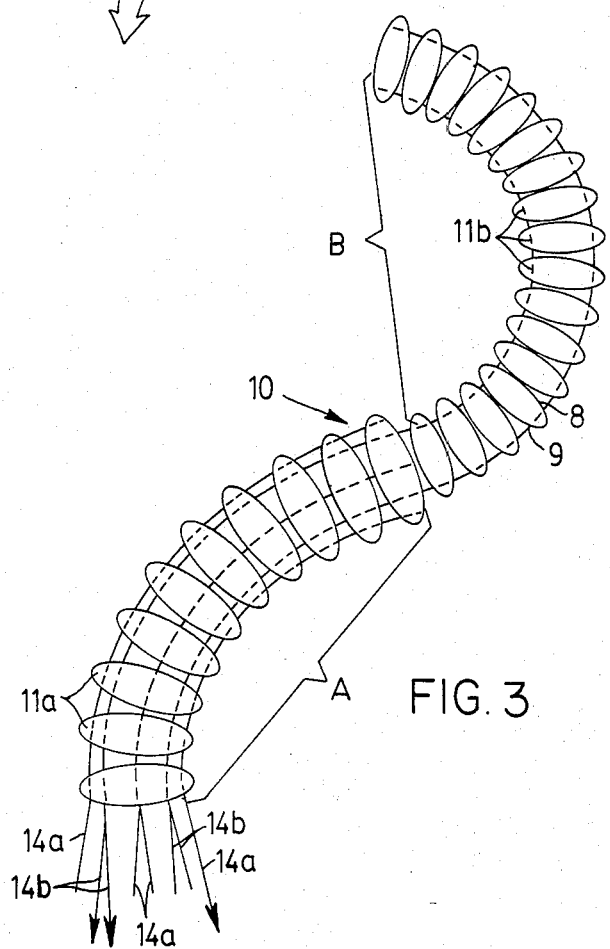
FIG. 3

FLEXIBLE ARM, PARTICULARLY A ROBOT ARM

This is a continuation-in-part application of pending prior application Ser. No. 351,589, now U.S. Pat. No. 4,393,728 filed Feb. 23, 1982, which is a continuation of application Ser. No. 129,202, filed Mar. 11, 1980, now abandoned.

FIELD OF THE INVENTION

The present invention refers to a flexible arm, particularly a robot arm, for supporting and/or manipulating tools or the like, said arm comprising a number of elements arranged in a series for contacting each other and power-generating and/or power-transmitting actuating means arranged to operate between or on the elements or a group of elements respectively.

DESCRIPTION OF THE PRIOR ART

Industrial robots are known in a number of different embodiments and they usually consist of a machine, which without manual supervision or control can change the position of an object or a tool in a three dimensional space to a number of alternative points. The main portion of the industrial robot is its robot arm with its associated motion generating control system and program equipment, which can be a mini-computer for example. Advanced robots have a robot arm with up to six degrees of freedom, i.e. a possibility to move in six different planes, for example motion forwards, backwards, upwards, downwards, rotation to the left and rotation to the right. Since the invention refers to an improvement in the robot arm, the control systems and program equipment will not be further described since they can consist of previously known units.

Conventional robot arms are built up from a number of elements and joints, which besides the tool and the load also must support the equipment for the motion and power generation for the separate elements. This equipment usually comprises pneumatic or hydraulic cylinders, electric motors etc., which means that the elements and the joints have to be relatively coarse or heavy, in order to be able to support the equipment. Thus the robot will have a bulky shape and comparatively large external dimensions, which will reduce the flexibility of the robot arm. The pattern of motion and the working ranges of most existing robot arms are otherwise limited and despite all degrees of freedom mainly comprise only a plane circular working field. Another limitation of conventional robot arms is that they cannot be entered into curved or angled spaces or perform manipulations on the side of an object turned away from the robot. Another drawback is that the manufacturing costs are very high.

There have also been developed robot arms with higher flexibility, where the relative motion between each element is achieved via a flexible shaft or a ball joint. Such structural members require high accuracy during manufacture and also careful maintenance. They have limited mobility and their load carrying capacity is entirely dependent on the dimensions of the joint member. Ball or shaft joints are furthermore sliding bearings which are exposed to rather high wear if a continuous lubrication cannot be guaranteed. They are furthermore sensitive to dust particles which can penetrate between the bearing surfaces. For this reason the elements have to be carefully encased, which will impair their accessability, maintenance and particularly a satisfactory lubrication. Owing to the very high demands for accuracy the manufacturing costs are very high.

A condition for achieving the desired flexibility without reducing the load carrying capacity of the arm is that the actuating means, i.e. the wires interconnecting the separate elements, are prestressed so that the surface contact between the elements is strong. Considering the desired flexibility the elements contacting each other have hitherto been designed as ball or shaft joints. These joint members have a radius of curvature equal to the height of half the joint member, whereby the problem will arise that the elements do not have a clearly established position for a certain length of the wire that has been taken in. A robot arm according to this embodiment has therefore a good stability only in the plane of curvature of the arm, while its rigidity in a plane perpendicular to the plane of curvature is poor.

Another problem with wire operated robot arms is that they in certain cases also have a poor torsion resistance, which is determined by the shape of the joint member, (i.e. type of contact zone between the elements), and which prevents the elements from being rotated perpendicular to their rolling plane.

BRIEF SUMMARY OF THE INVENTION

The purpose of the present invention is to provide a robot arm having a very broad working range and a maximum motion pattern, whereby is meant that it will reach almost all points inside a spherical working field. Another purpose is to provide a robot arm, which can be bent so that it can reach the same point by way of a great number of curvature combinations and thereby provide a very high accessability, which means that it can even pass obstacles of different kinds or bend itself around an object. A further purpose is to provide an arm with a very high rigidity in the element plane of curvature and a high torsion resistance and which is cheaper to manufacture as compared to conventional industrial robots. This has according to the invention been achieved by each element having single or double-curved segments or flat surfaces, and combinations of flat and/or curved surfaces, the curved contact surfaces of said segments each being located to contact a contact surface of the adjacent segment, the elements being arranged to perform a rolling motion in relation to each other when actuated by said power-generating and/or power-transmitting actuating means.

BRIEF DESCRIPTION OF THE DRAWINGS

The invention will now be described with reference to the attached drawings wherein, FIG. 1 is a schematic perspective view of a basic embodiment of the arm according to the invention, FIG. 2 shows the arm according to FIG. 1 in a bent position, FIG. 3 is a schematic side view of a robot arm according to the invention composed of two groups of elements and thereby being bendable in two different planes or directions.

DETAILED DESCRIPTION

Figure 4:
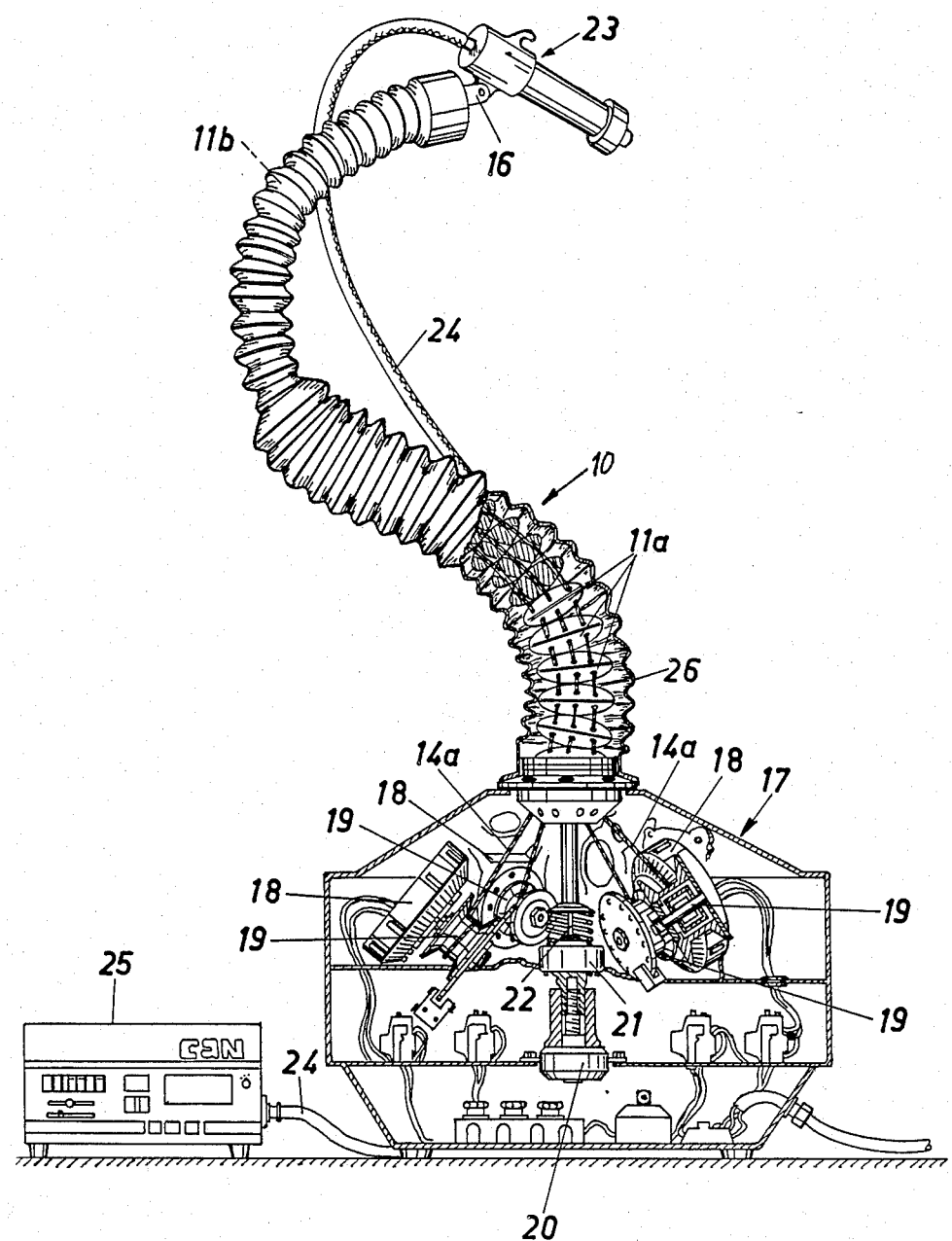
FIG. 4 is an elevational, partly perspective and partly sectional view of a complete industrial robot provided with a flexible arm according to the invention.

The flexible arm 10 according to the invention, hereinafter called the robot arm, fundamentally comprises as shown in the embodiment of FIGS. 1 and 2, a number of elements 11 arranged in series and each being designed as a circular disc with curved contact surfaces. Depending on the extent of bending motions the arm shall be able to perform, each element 11 is provided with a number of holes 12 e.g. four holes placed close to the outer edge of the element and on equal distance from each other and from the center of the element, said holes being intended for an equal number of actuating means 14. A through-opening 13 is arranged in the center of the element. The elements are arranged in abutting contact with each other with the guiding holes 12 being located in substantial alignment.

In the top element the guiding holes 12 are countersunk, said counter-sinks receiving termination members 15 arranged at the outer ends of the actuating means. The actuating means 14 consist of cables, wires or the like having good tensile strength. By pulling one or more of the wires 14 projecting outside the last element the robot arm can be bent in all directions. If a bending movement is desired between two actuating means 14, as shown in FIG. 2, these are both subjected to a pull, whereby the bending movement can be more or less displaced toward the first or second means 14 by altering the magnitudes of the pulls. The arm 10 can thereby also be brought to perform a rotational movement about its longitudinal axis.

A flexible transmission means 16 passes through the central openings 13 in the elements, said transmission means being intended to transmit tensile—compressive—and/or rotational forces to a tool 23 (FIG. 4) or the like arranged at the free end of the arm.

As can be seen from FIG. 3 the elements can be kept together in groups, where each group is operated with actuating means 14 special for this group. The arm according to FIG. 3 comprises two groups, a lower group A and an upper group B. The elements 11a of the group A are operated by the actuating means 14a, while the elements 11b of the group B are operated by the actuating means 14b. In order to achieve the double-curve shown in FIG. 3 of the arm in one plane, two diametrically opposed actuating members 14a and 14b are actuated as shown with arrows. The two groups A and B of the arm can also perform bendings in different planes by appropriate actuation of the means 14a and 14b. The arm can of course also be provided with more than two groups of elements, so that it can even be bent 360° or more in different planes or directions if desired.

Figure 6:
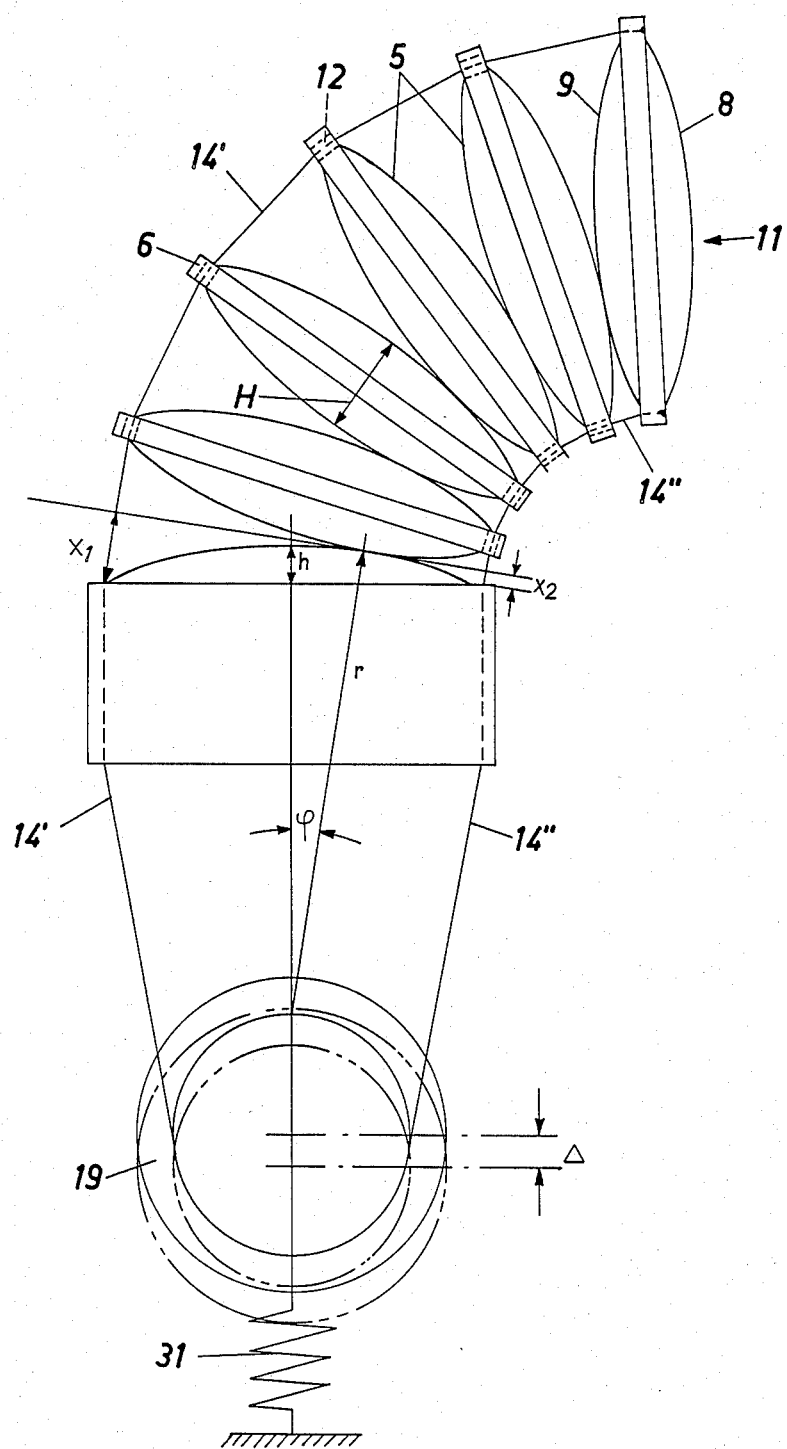
FIG. 6 is an elevation view on a larger scale of a part of the arm according to one embodiment of the inven

In FIG. 4 is shown a practical application of the arm according to the previous embodiment. The flexible arm 10 composed by two groups of elements 11a and 11b is connected at one end to a machine unit 17, which contains four servo-motors 18, which drive a winding drum 19 for each actuating means 14a and 14b. The motors 18 are reversible and controlled so that each actuating means—each wire—14a and 14b can be subjected to an individually adjustable force during the winding on as well as during the unwinding from the winding drum 19. Resilient prestressing means 31 (FIG. 6) are arranged for the wires 14.

The flexible transmission means 16 is at the lower end of the arm connected to a servo-motor 20 by way of a gear device 21 and an overload protective coupling 22. A tool 23 is connected to the central transmission means 16 at the free end of the arm, said tool comprising a spray gun fed through a tube 24 from a spray painting device 25.

For certain applications it is also possible to transport the work medium to the tool 23 through the central openings of the elements in parallel with the transmission means 16.

The separate elements 11 are enclosed in a protective flexible casing 26.

Figure 5:
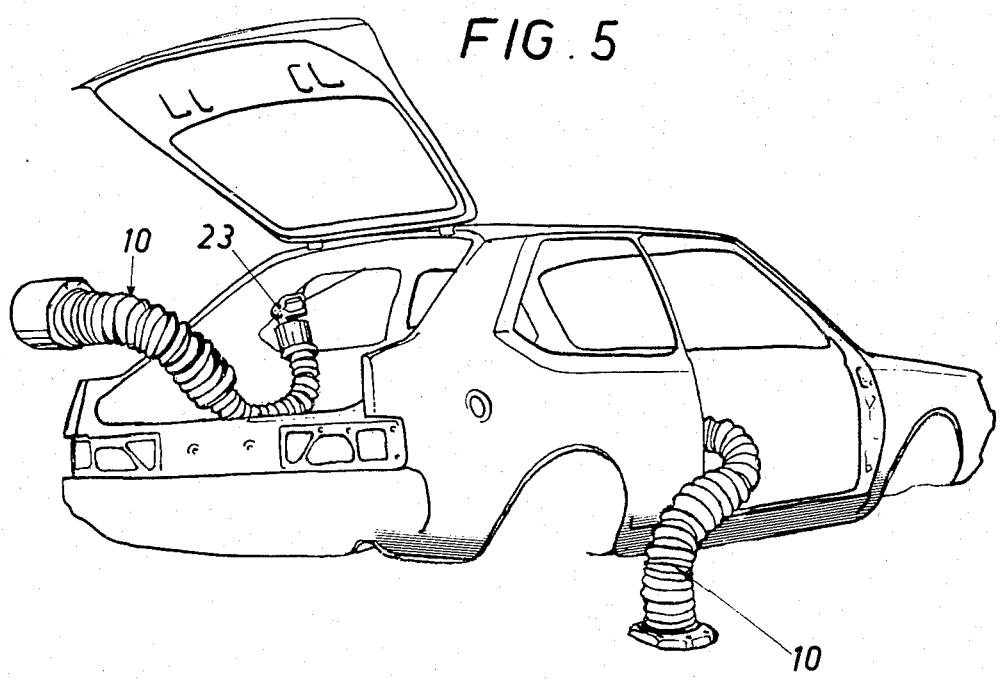
FIG. 5 is a perspective view showing the capability of the robot arm of the invention in reaching around corners etc.

The flexibility, working range and accessability of the robot arm is illustrated in FIG. 5, which shows that the arm can be bent in such a way that it can even perform manipulations behind obstacles or in spaces otherwise difficult to reach.

Figure 7:
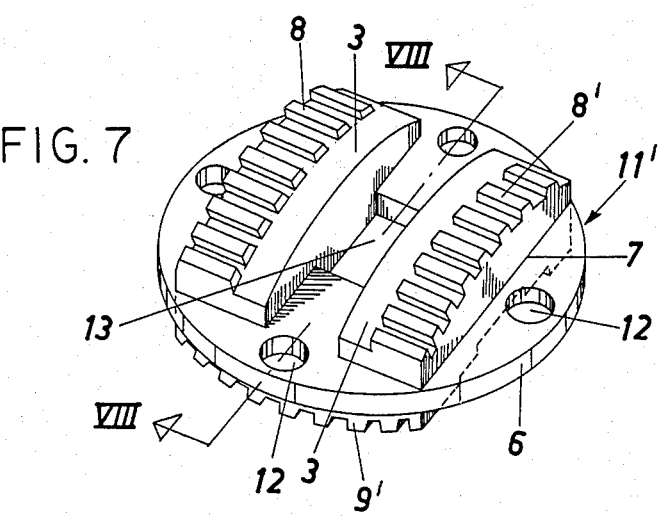
- FIG. 7 is a perspective view of a lamella shaped element according to another embodiment of the invention.
Figure 8:
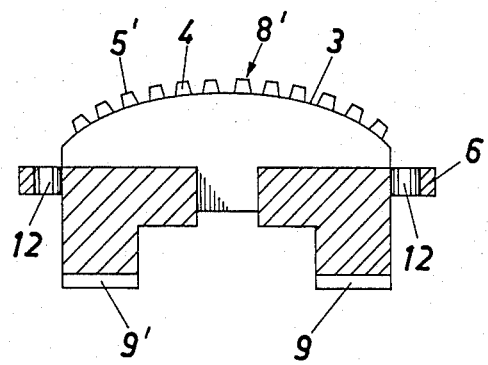
FIG. 8 is a cross-sectional view taken along line VIII—VIII in FIG. 7.

In the embodiment according to FIGS. 7 and 8 each element 11' comprises two segment-shaped members 8' and 9' between which a spacing disc 6 is arranged. The segments 8' and 9' have each a single curved contact surface 5' and a plane base surface 7, with which the segments abut against a side each of the spacing disc 6. The segments 8' and 9' can either be attached to the spacing disc 6 or they can be formed intergral therewith. The segments 8' and 9' are arranged in mutually orthogonal planes, which means that every other segment can perform a bending movement in one plane and every other segment a corresponding bending movement in a plane perpendicular to the first mentioned plane. In order to obtain stable positions independent of the bending positions for the separate segments 8' and 9' and without being dependent on a good or poor friction between the contact surfaces, these can be provided with steering means 4, for example teeth cooperating with corresponding teeth in the adjacent element 11' at the relative movement of the segments. The segments 8' and 9' are preferably formed as portions of cylindrical toothed wheels, at which the center of curvature of the single curved contact surface 5 or the center of the pitch circle of the teeth are located outside each element respectively.

Flat segment portions 3 are arranged beside the teeth provided segments 8' and 9' on level with the root of the tooth.

By making the segments 8' and 9' as part cylindrical toothed wheels, in each element 11' arranged in mutually perpendicular planes, an alternating deflection possibility is achieved at each teeth engagement. The deflection angles are superposed and the arm is totally seen given the same possibilities to move as if the contact surfaces had been flat. This design also guarantees that a very good torsional rigidity is achieved since the elements owing to their shape can perform movements only in certain directions. Because of the tooth flange contact there will always be linear contact between two cooperating segments. The large tooth width and/or the flat segment portions 3 give a large contact surface, which in turn results in greater freedom of choice of materials for the segments. Instead of having to use hardened contact surfaces the new device permits the use of appropriate plastic, aluminum, or similar materials.

In previously known all round-flexible robot arms with a joint between each two elements the radius of the joint member r is equal to half the height h of the element, i.e. $r = \frac{1}{2}h$. This means that such elements do not have a certain definite position for a certain length of the wound up wire, and a robot arm comprising such elements therefore has not the required rigidity.

In order for an arm which comprises a great number of elements to be rigid it is required that a relative change of the position of the elements when bending the arm involves a change of the energy stored in the system. The higher this work is the more stable the arm will be.

This has according to the invention (see FIG. 6) been achieved by the fact that the radius r of each segment 8 and 9 is larger, preferably even much larger than the height h of the segment. In that way the sum of the wire lengths 1 and 2 for each arbitrary torsional angle of the elements 11 will never be equal and this difference Δ represents a change of energy of the arm system. Since the sum of the wire length 14', 14" wound up and wound out is constant, since the wire is wound on a common drum 19, Δ will be identical with the movement of the wire drum. This movement together with the spring force is an important energy addition for achieving the desired rigidity.

Figure 9:
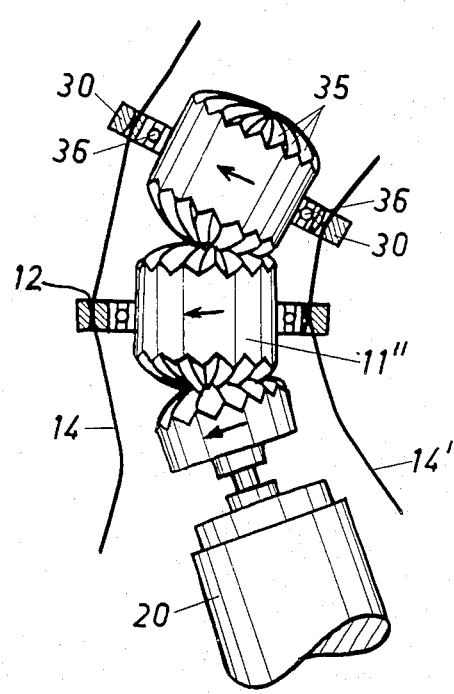
FIG. 9 is an elevational view partly in section of an embodiment which can also perform rotational movements.

The modification shown in FIG. 9 is developed for making it possible also to transfer rotational movements by way of the elements, which for this purpose are provided with radial teeth 35 on the curved surfaces facing each other, said teeth engaging each other independent of which angular positions the elements take. In order to permit the rotational movement of the elements its flanges 30 with openings 12 for the wires 14 are rotatable relative to the element member, which has been achieved by arranging a bearing 36 between these parts. By means of a motor 20 the elements can in this way transfer rotational movements to the free end of the arm and to the tool 23 without in any way impairing the flexibility of the arm.

For transferring great loads and/or moments it is preferred to supplement the wire cable-shaped actuating means 14, which only have a connecting function, with electromagnetic or hydraulic servo-motors.

Figure 10:
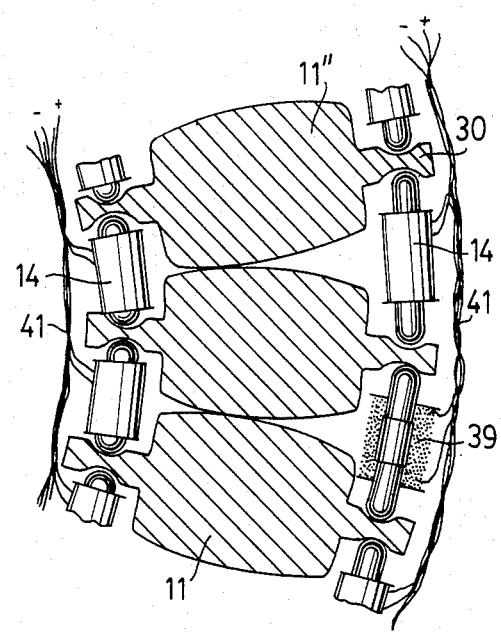
FIGS. 10 and 11 are cross-sectional views through two additional embodiments, showing elements actuated electromagnetically.

The embodiment according to FIG. 10 shows a modification with electromagnetic adjustment of the angular position of the elements relative to each other, whereby between each flange 30 are pivotally mounted electromagnets 39, which are arranged to adjust the distance between the elements. Each electromagnet can possibly be individually actuated for providing the highest possible moveability and flexibility.

Figure 11:
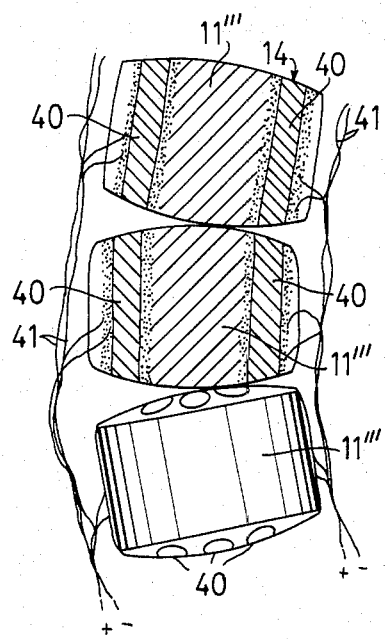

Instead of arranging moveable iron cores in a coil, as the embodiment shown in FIG. 10, it is possible to use non-moveable electromagnets oriented axially in the elements as shown in FIG. 11. Each non-moveable electromagnet 40 has its poles facing each other and in order to achiefe a variable bending of the arm several such bar shaped magnets can be arranged in a radial pattern in the elements.

In both embodiments according to FIGS. 10 and 11 electric supply cables to the electromagnets are denoted by 41.

Figure 12:
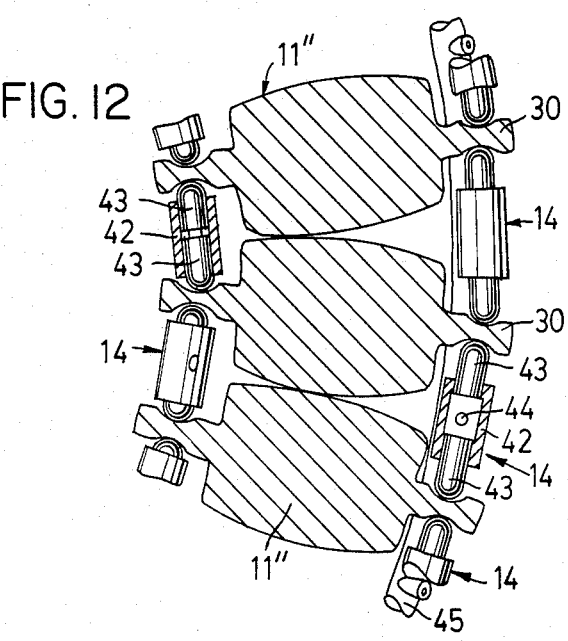
FIGS. 12, 13 and 14 are cross-sectional views showing further embodiments with hydraulic or pneumatic actuation of the elements.

Electromagnetic actuating means usually work only between two fixed end positions, whereby a stepless adjustment of the bending of the arm is impossible. This limitation is eliminated with the embodiment shown in FIG. 12, where the actuating means comprises hydraulic or pneumatic servo-motors in the form of cylinders 42 with double opposed pistons 43. The pressure medium can be supplied from a feed tube 45 (not shown) through a central inlet or outlet 44. The pistons 43 are pivotally mounted at the peripheral flange 30 of the elements. The feed tube 45 is preferably passed through apertures (not shown) in the flange 30.

Figure 13:
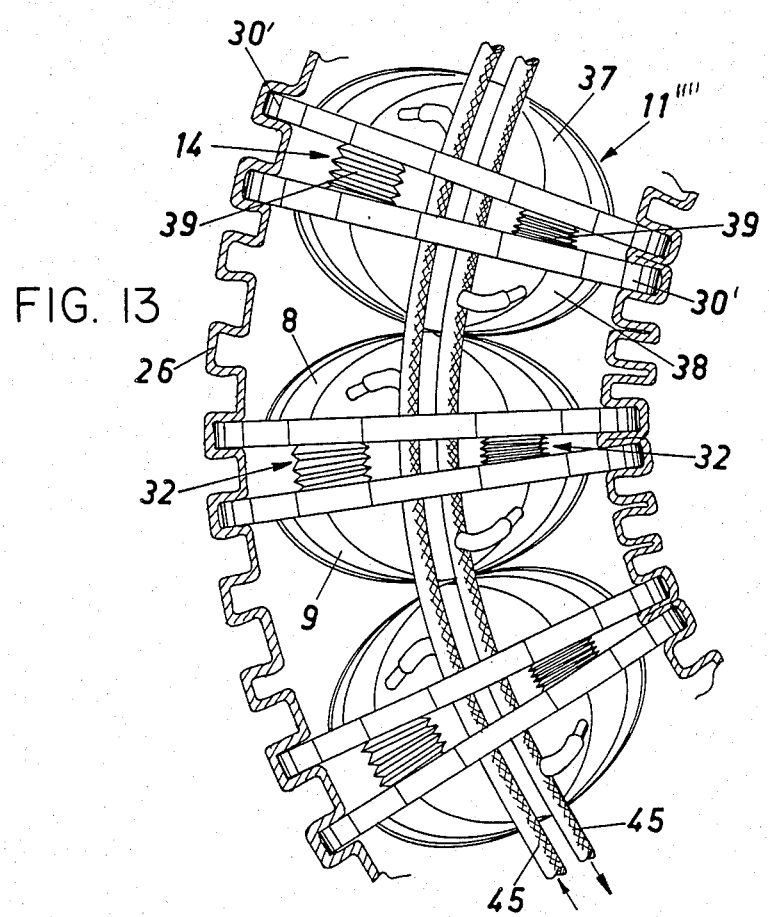

In FIG. 13 is shown an embodiment wherein the elements 11'''' are divided into two parts along peripheral flanges and where each part 37 and 38 is provided with a peripheral flange 30'. Servomotors 32 are arranged between these two parts 37 and 38 in such a way that the two parts can be moved into different relative inclined positions. The servomotors 32 consist of short-stroke hydraulic or pneumatic motors, for example piston cylinder devices or bellows actuated by a pressure medium. At least three such motors are arranged at equal distances from each other and conduits 45 cupply them with pressure medium.

Figure 14:
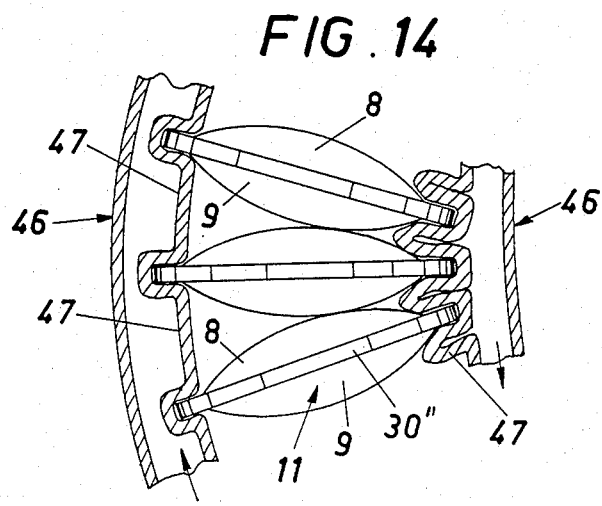

A further embodiment where the elements are actuated by hydraulic or pneumatic means is shown in FIG. 14. A number of pressure tubes 46 with radially projecting pressure lips 47 are arranged to operate between peripheral flanges 30'' of the elements. When a pressure is supplied in the tube 46 the pressure lips 47 will expand and displace the flanges 30'' of the elements from each other. The tubes 46 can be an integral portion of the casing 26 of the arm 10 shown in FIG. 4.

FIGS. 15, 16, 17 and 18 show further embodiments of the invention wherein the elements have different curved surface configurations or cooperate with additional members having a plane surface, or surfaces. In these figures the elements are shown only schematically to illustrate only the cross-sectional configuration of the elements, such as in FIGS. 10, 11 and 12, but it is to be understood that these embodiments are intended to be used in the same manner as the previously described embodiments and although holes comparable to 12 and 13, or actuating means 14, 20, 32, 39, 40, 41, 45, 46, etc., and cooperating structural members are not shown, these further embodiments may be provided with these other features of the invention in accordance with the specific actuators, or combinations thereof, desired.

Figure 15:
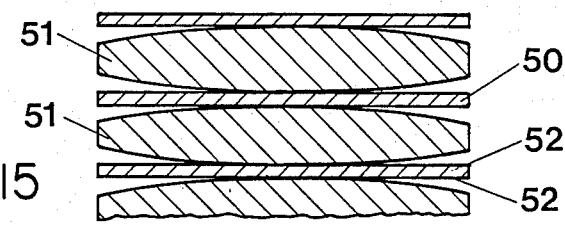
FIGS. 15 and 16 are cross-sectional views through further embodiments of the invention showing combinations of curved and flat contacting surfaces on the elements.

In FIG. 15 is shown the embodiment wherein a disc 50 having plane or flat surfaces 52 on opposite sides is interposed between adjacent elements 51 so that the curved surfaces of elements 51 have rolling contact on the plane surfaces. Of course, the adjacent members 50, 51 can be regarded as the elements of a robot arm wherein the adjacent elements have curved and flat surfaces respectively in rolling engagement with each other. This design provides a higher rigidity in use than the embodiments utilizing elements having oppositely curved convex contacting surfaces.

Figure 16:
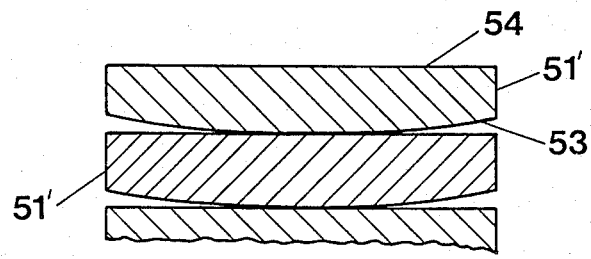

FIG. 16 shows the embodiment similar to FIG. 15 but wherein the elements 51' each have one convex curved surface 53 and one plane or flat surface 54 on opposite sides thereof. The curved surface of each element engages the flat surface of the adjacent element.

Figure 17:
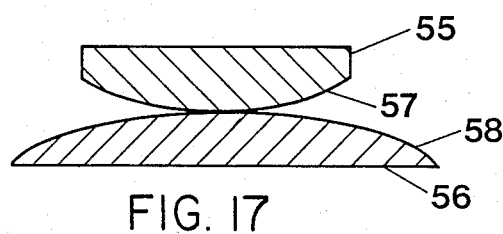
FIG. 17 is a cross-sectional view through another embodiment having contacting convex surfaces of different radii.

In FIG. 17 is shown the embodiment wherein adjacent elements 55, 56 have contacting convex surfaces 57, 58 having different radii (see r in FIG. 6) of curvature to provide a different degree of flexibility.

Figure 18:
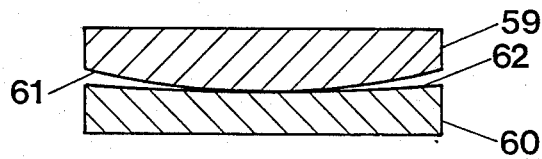
FIG. 18 is a cross-sectional view of a further embodiment wherein one contacting surface is convex and the other is concave.

FIG. 18 shows an embodiment wherein adjacent elements 59, 60 have convex and concave contacting surfaces, 61 and 62 respectively, for greater rigidity.

It is to be understood that the above configurations of cooperating contact surfaces for the elements can be used in any combination to produce the flexibility, strength, and rigidity desired for a robot arm.

We claim:

1. A flexible arm, particularly a robot arm, for supporting and/or manipulating tools or the like comprising a plurality of elements arranged in series with adjacent elements contacting each other, at least one contact surface on each element contacting a contact surface of an adjacent element, at least one of said contact surfaces being convexly curved for rolling motion on the other contact surface of the adjacent element, the radius of curvature of said curved surface being relatively larger than half the height of the curved part of said element, the radius of curvature of the other contact surface on the adjacent element varying from a value which is relatively substantially larger compared with the contact surface of the first mentioned element to infinity, and actuating means operably connected to said elements to move them with respect to each other so that said adjacent elements have a rolling motion on said contact surfaces.

2. A flexible arm as claimed in claim 1 wherein said one contact surface is convexly curved and said other contact surface is flat.

3. A flexible arm as claimed in claim 2 wherein each element has said convex surface on one face and said flat surface on the opposite face, said convex surfaces of the elements contacting said flat surfaces of the adjacent elements.

4. A flexible arm as claimed in claim 2 wherein at least one element comprises a double convex curved member having the curved surfaces oppositely disposed with respect to each other, and said adjacent element comprises a disc member having oppositely disposed flat faces, so that in a series of elements said disc members are interposed between said double convex curved members.

5. A flexible arm as claimed in claim 1 wherein both of said contact surfaces are convexly curved, one contact surface having a substantially greater radius of curvature than the other.

6. A flexible arm as claimed in claim 1 wherein said one contact surface is convexly curved and said other contact surface is a concave surface having a radius of curvature substantially larger than the radius of curvature of said convex surface.

* * * * *